United States Patent
Shirai

(10) Patent No.: US 10,062,016 B2
(45) Date of Patent: Aug. 28, 2018

(54) LIGHT SCANNING DEVICE AND IMAGE FORMING APPARATUS WITH THE SAME

(71) Applicant: Sharp Kabushiki Kaisha, Osaka-shi, Osaka (JP)

(72) Inventor: Nobuhiro Shirai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/980,063

(22) Filed: Dec. 28, 2015

(65) Prior Publication Data

US 2016/0110634 A1    Apr. 21, 2016

Related U.S. Application Data

(63) Continuation of application No. 14/433,710, filed as application No. PCT/JP2013/077955 on Oct. 15, 2013, now Pat. No. 9,250,439.

(30) Foreign Application Priority Data

Oct. 17, 2012   (JP) ................................. 2012-230098

(51) Int. Cl.
G02B 13/00      (2006.01)
H04N 1/06       (2006.01)
(Continued)

(52) U.S. Cl.
CPC .............. G06K 15/14 (2013.01); B41J 2/471 (2013.01); G02B 13/0005 (2013.01);
(Continued)

(58) Field of Classification Search
CPC ....... B41J 2/471; B41J 2/473; G02B 13/0005; G02B 26/125
See application file for complete search history.

(56) References Cited

U.S. PATENT DOCUMENTS 5,793,408 A    8/1998  Nakajima
6,377,381 B1 * 4/2002  Matsuo ................ G02B 26/127
                                                      359/204.1
(Continued)

FOREIGN PATENT DOCUMENTS

JP      06-015023 U    2/1994
JP      08-234129 A    9/1996
(Continued)

OTHER PUBLICATIONS

Shirai, "Light Scanning Device and Image Forming Apparatus With the Same", U.S. Appl. No. 14/433,710, filed Apr. 6, 2015.

*Primary Examiner* — John P Zimmerman
(74) *Attorney, Agent, or Firm* — Keating & Bennett, LLP

(57) ABSTRACT

A light scanning device includes: a first semiconductor laser 44a that emits a light beam L1; a polygonal mirror 42 that deflects the light beam L1; a reflective mirror 64a that reflects the light beam L1 deflected by the polygonal mirror 42 and causes the light beam L1 to enter a photosensitive drum 13; and a BD sensor 72 that detects the light beam L1 deflected by the polygonal mirror 42. The light scanning device scans the photosensitive drum 13 with the light beam L1 and set scanning timing of the photosensitive drum 13 using the light beam L1 based on detection timing of the light beam L1 using the BD sensor 72. The BD sensor 72 is arranged in the position farther from the polygonal mirror 42 than the last reflective mirror 64a that reflects the light beam L1 immediately before entering the photosensitive drum 13 and arranged inside a scanning angle range α of the light beam L1 corresponding to an effective scan area of the photosensitive drum 13.

14 Claims, 11 Drawing Sheets

(51) Int. Cl.
*G06K 15/14* (2006.01)
*H04N 1/053* (2006.01)
*H04N 1/113* (2006.01)
*H04N 1/12* (2006.01)
*B41J 2/47* (2006.01)
*G03G 15/04* (2006.01)
*G03G 15/043* (2006.01)
*G02B 26/12* (2006.01)

(52) U.S. Cl.
CPC ......... *G02B 26/123* (2013.01); *G02B 26/124* (2013.01); *G02B 26/127* (2013.01); *G03G 15/04* (2013.01); *G03G 15/043* (2013.01); *H04N 1/053* (2013.01); *H04N 1/0607* (2013.01); *H04N 1/1135* (2013.01); *H04N 1/12* (2013.01); *G02B 26/122* (2013.01); *G02B 26/125* (2013.01); *H04N 2201/0082* (2013.01); *H04N 2201/04713* (2013.01); *H04N 2201/04732* (2013.01); *H04N 2201/04744* (2013.01)

(56) References Cited

U.S. PATENT DOCUMENTS

| | | | |
|---|---|---|---|
| 6,693,725 B1 * | 2/2004 | Kanno | H04N 1/053 358/1.9 |
| 7,298,390 B2 * | 11/2007 | Nakahata | G02B 26/127 347/231 |
| 7,528,856 B2 * | 5/2009 | Kato | B41J 2/471 347/242 |
| 8,174,747 B2 * | 5/2012 | Amada | B41J 2/471 347/242 |
| 8,194,300 B2 * | 6/2012 | Taniguchi | G02B 26/105 347/247 |
| 2003/0156183 A1 * | 8/2003 | Ishihara | B41J 2/473 347/234 |
| 2008/0285095 A1 * | 11/2008 | Iwamoto | B41J 2/471 358/481 |
| 2013/0286143 A1 * | 10/2013 | Nakahata | G03G 15/043 347/224 |

FOREIGN PATENT DOCUMENTS

| | | |
|---|---|---|
| JP | 2000-047125 A | 2/2000 |
| JP | 2003-075761 A | 3/2003 |
| JP | 2005-309300 A | 11/2005 |
| JP | 2006-198896 A | 8/2006 |
| JP | 2008-058628 A | 3/2008 |

* cited by examiner

LIGHT SCANNING DEVICE AND IMAGE FORMING APPARATUS WITH THE SAME

TECHNICAL FIELD

The present invention relates to a light scanning device that scans a scan object with light beam and an image forming apparatus with the light scanning device.

BACKGROUND ART

For example, a color image forming apparatus using an electrophotographic image forming method uniformly charges the surfaces of respective photosensitive bodies (respective scan objects) corresponding to a plurality of colors and then scans the respective photosensitive body surfaces with respective light beams so as to form respective electrostatic latent images on the respective photosensitive body surfaces. The color image forming apparatus develops the electrostatic latent images on the respective photosensitive body surfaces using respective colors of toner to form toner images in the respective colors on the respective photosensitive body surfaces. The color image forming apparatus superimposes and transfers the toner images in the respective colors from the respective photosensitive bodies to an intermediate transfer body so as to form a color toner image on the intermediate transfer body, and then transfers this color toner image from the intermediate transfer body to a recording paper sheet.

The respective photosensitive bodies are scanned with the respective light beams by a light scanning device. Typically, four colors, which are black, cyan, magenta, and yellow, of toner are used. Accordingly, it is necessary to scan four photosensitive bodies using at least four light beams, and four light-emitting elements for emitting the four light beams need to be used.

Nowadays, there is a need for downsizing and thinning of the image forming apparatus, and a downsized and thinned light scanning device becomes necessary. Accordingly, there is proposed a light scanning device with the following configuration. A polygonal mirror (deflecting section) is arranged approximately in the center of the light scanning device. Two optical systems are arranged symmetrical with respect to the polygonal mirror at the center. Respective light beams emitted from the respective light-emitting elements are reflected by the polygonal mirror so as to be divided into the respective optical systems. The respective optical systems cause the respective light beams to enter the respective photosensitive bodies.

On the other hand, a BD sensor is disposed to detect a light beam deflected by the polygonal mirror, and the scanning timing on the photosensitive body using the light beam is set based on the detection timing of the light beam using the BD sensor. In short, the scanning timing on the photosensitive body using the light beam is synchronized with the detection timing of the light beam using the BD sensor.

Here, the light beam is reflected by the polygonal mirror to be repeatedly deflected in the range having an approximately fan shape. This range having an approximately fan shape includes the scanning angle range of the light beam that scans a scan object. The BD sensor is often disposed outside the scanning angle range of the light beam. For example, in Patent Literatures 1 and 2, a BD sensor is arranged outside the scanning angle range of the light beam, and the light beam deflected by a polygonal mirror enters the BD sensor.

In Patent Literatures 3 and 4, a detecting mirror and a BD sensor are arranged outside the scanning angle range of the light beam, and the light beam deflected by a polygonal mirror is reflected by the detecting mirror such that the light beam enters the BD sensor.

CITATION LIST

Patent Literature

PATENT LITERATURE 1: Japanese Unexamined Patent Application Publication No. 2004-333556
PATENT LITERATURE 2: Japanese Unexamined Patent Application Publication No. 2011-242601
PATENT LITERATURE 3: Japanese Unexamined Patent Application Publication No. 2011-95559
PATENT LITERATURE 4: Japanese Unexamined Patent Application Publication No. 06-59205

SUMMARY OF INVENTION

Technical Problem

However, since the BD sensor is mounted on a substrate, the substrate of the BD sensor provides a negative effect on downsizing and thinning of the light scanning device depending on the arranged position of the BD sensor. For example, in Patent Literatures 1 to 4, since the BD sensor is out of the scanning angle range of the light beam, it is necessary to increase the width and the depth of the light scanning device to cover the scanning angle range of the light beam and the substrate of the BD sensor. In the case where the substrate of the BD sensor is arranged within the scanning angle range of the light beam, the substrate of the BD sensor interferes with the light beam.

The present invention has been made to solve the above-described conventional problems, and it is an object of the present invention to provide a light scanning device that ensures further downsizing and an image forming apparatus with that light scanning device.

Solutions to the Problems

To solve the above-described problems, a light scanning device according to the present invention includes a light-emitting element, a deflecting section, at least one reflective mirror, and an optical sensor. The deflecting section is configured to deflect a light beam emitted from the light-emitting element. The reflective mirror is configured to reflect the light beam and cause the light beam to enter a scan object. The light beam is emitted from the light-emitting element and deflected by the deflecting section. The optical sensor is configured to detect the light beam deflected by the deflecting section. The light scanning device is configured to scan the scan object with the light beam and set scanning timing of the scan object using the light beam based on detection timing of the light beam using the optical sensor. The optical sensor is arranged in a position farther from the deflecting section than a last reflective mirror that reflects the light beam immediately before entering the scan object and arranged inside a scanning angle range of the light beam corresponding to an effective scan area of the scan object.

In this light scanning device according to the present invention, the optical sensor is arranged inside the scanning angle range of the light beam corresponding to the effective scan area of the scan object. It is only necessary to set the size of the light scanning device to include the scanning angle range of the light beam. Accordingly, the light scanning device can be downsized. Additionally, the optical sensor is arranged in the position farther from the deflecting section than the last reflective mirror, which reflects the light beam immediately before entering the scan object. Accordingly, the optical sensor and the substrate of the optical sensor do not interfere with the light beam.

In the light scanning device according to the present invention, the last reflective mirror may be arranged at one end inside a housing of the light scanning device.

In this case, the size of the housing of the light scanning device can be set according to the position of the last reflective mirror so as to set the minimum size of the housing.

Further, in the light scanning device according to the present invention, the following configuration is possible. The light scanning device further includes a plurality of the light-emitting elements. The optical sensor detects a light beam of any of the plurality of the light-emitting elements. The last reflective mirror reflects the light beam detected by the optical sensor to the scan object.

In the case where a color image is formed, respective light-emitting elements corresponding to a plurality of colors are disposed. The optical sensor detects a light beam of any of the respective light-emitting elements to synchronize the scanning timing of the photosensitive body using the light beam with the detection timing of the light beam using the optical sensor.

In the light scanning device according to the present invention, the following configuration is possible. The light scanning device further includes a detecting mirror configured to reflect a light beam deflected by the deflecting section and cause the light beam to enter the optical sensor. The optical sensor is arranged in a position where the light beam enters after the light beam is reflected by the detecting mirror and passes above an upper end or below a lower end of the last reflective mirror.

By disposing this detecting mirror, it is possible to arrange the optical sensor inside the scanning angle range of the light beam corresponding to the effective scan area of the scan object.

Further, in the light scanning device according to the present invention, the following configuration is possible. The detecting mirror is arranged outside the scanning angle range of the light beam corresponding to the effective scan area of the scan object. The optical sensor and the detecting mirror are arranged in a vicinity of a boundary between an inside and an outside of the scanning angle range of the light beam.

As just described, the optical sensor and the detecting mirror are disposed in the vicinity of the boundary between the inside and the outside of the scanning angle range. Accordingly, the light beam reflected by the detecting mirror approximately vertically enters the light receiving surface of the optical sensor such that the light receiving amount of the optical sensor increases. This improves the detection accuracy using the optical sensor.

In the light scanning device according to the present invention, the following configuration is possible. The detecting mirror is arranged outside a bottom section of a housing of the light scanning device. A light beam entering and reflected to the detecting mirror passes through a hole formed in the bottom section.

This facilitates mounting of the detecting mirror.

Further, in the light scanning device according to the present invention, the following configuration is possible. The light scanning device further includes an fθ lens disposed in an optical path of light beam from the deflecting section to the last reflective mirror. The fθ lens includes an optical section configured to transmit the light beam immediately before entering the detecting mirror. The optical section has focusing property.

This optical section allows adjustment of the distance from the deflecting section to the detecting mirror and the distance from the detecting mirror to the optical sensor so as to downsize the light scanning device.

In the light scanning device according to the present invention, the following configuration is possible. The optical sensor is mounted on a substrate disposed outside a sidewall of a housing of the light scanning device.

In this case, when the height of the substrate is set according to the sidewall of the housing of the light scanning device, the substrate does not cause an increase in height of the light scanning device. The substrate is overlapped with the sidewall of the housing of the light scanning device. This downsizes the light scanning device.

On the other hand, an image forming apparatus according to the present invention includes the above-described light scanning devices according to the present invention. The image forming apparatus forms a latent image on a scan object by the light scanning device, develops the latent image on the scan object as a visible image, and transfers and forms the visible image from the scan object to a paper.

This image forming apparatus also provides operations and effects similar to those of the above-described light scanning devices according to the present invention.

Advantageous Effects of Invention

According to the present invention, the optical sensor is arranged inside the scanning angle range of the light beam corresponding to the effective scan area of the scan object. It is only necessary to set the size of the light scanning device to include the scanning angle range of the light beam. Accordingly, the light scanning device can be downsized. Additionally, the optical sensor is arranged in the position farther from the deflecting section than the last reflective mirror, which reflects the light beam immediately before entering the scan object. Accordingly, the optical sensor and the substrate of the optical sensor do not interfere with the light beam.

DESCRIPTION OF EMBODIMENTS

Hereinafter, embodiments of the present invention will be described based on the accompanying drawings.

Figure 1:
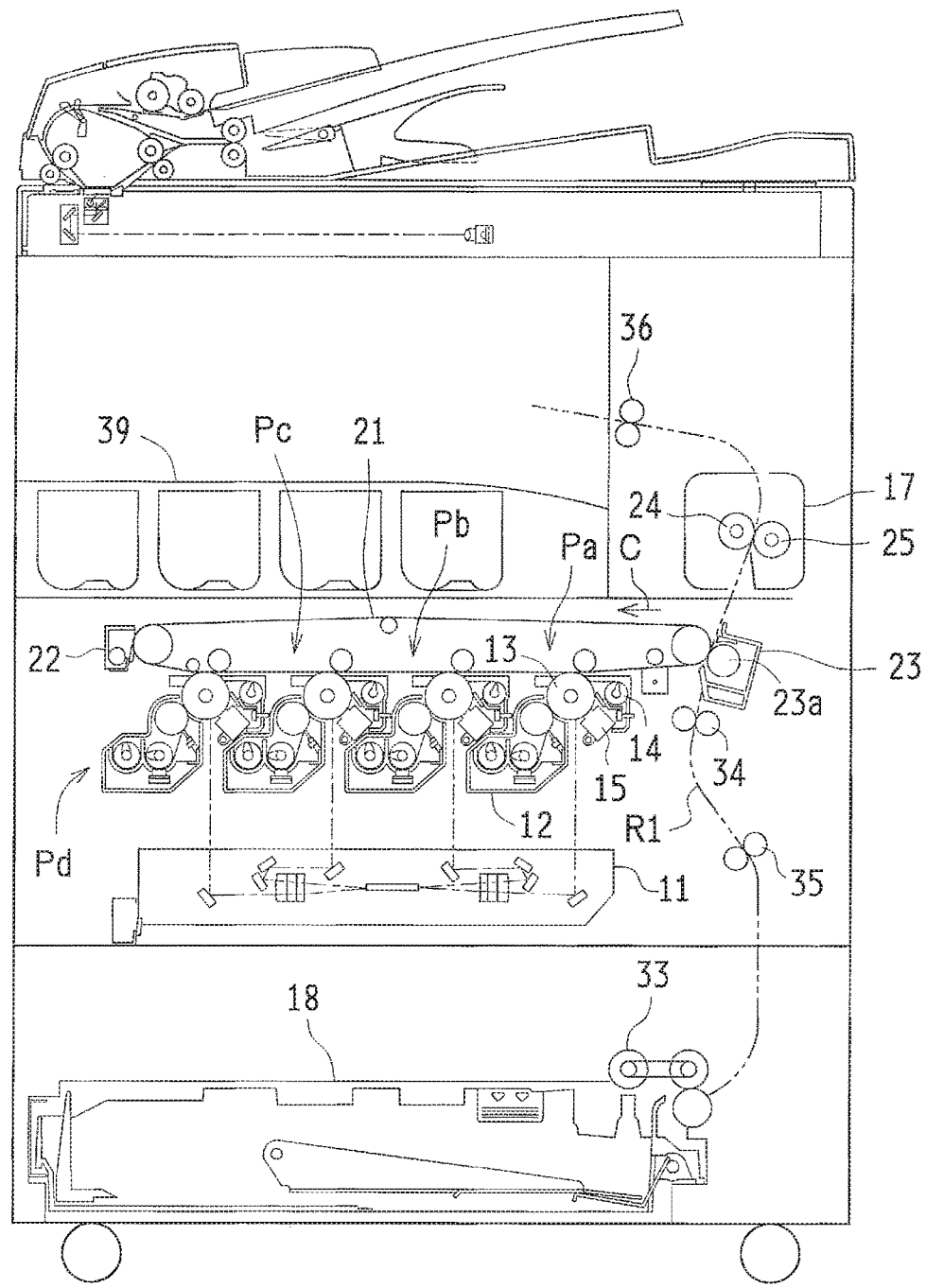
FIG. 1 is a cross-sectional view illustrating an image forming apparatus with one embodiment of a light scanning device according to the present invention.

FIG. 1 is a cross-sectional view illustrating an image forming apparatus with one embodiment of a light scanning device according to the present invention. The image data handled by this image forming apparatus 1 corresponds to a color image using respective colors of black (K), cyan (C), magenta (M), and yellow (Y); or corresponds to a monochrome image using a single color (for example, black). In view of this, a development apparatus 12, a photosensitive drum 13, a drum cleaning apparatus 14, a charging unit 15, and a similar apparatus are disposed for each of four to form four types of toner images according to the respective colors. Each apparatus corresponds to black, cyan, magenta, and yellow. Thus, four image stations Pa, Pb, Pc, and Pd are constituted.

The drum cleaning apparatuses 14 remove and recover residual toner at the surfaces of the photosensitive drums 13 of all of the respective image stations Pa, Pb, Pc, and Pd. Then, the charging unit 15 uniformly charges the surfaces of the photosensitive drums 13 at a predetermined electric potential. A light scanning device 11 exposes the surfaces of the photosensitive drums 13 to form electrostatic latent images at the surfaces. Then, the development apparatus 12 develops the electrostatic latent images on the surfaces of the photosensitive drums 13 and form toner images at the surfaces of the photosensitive drums 13. Thus, a toner image with each color is formed at the surface of the photosensitive drum 13.

Subsequently, while an intermediate transfer belt 21 is moved around the arrow direction C, a belt cleaning apparatus 22 removes and recovers residual toner at the intermediate transfer belt 21. Then, toner image with each color at the surface of the photosensitive drum 13 is sequentially transferred and superimposed to the intermediate transfer belt 21, thus a color toner image is formed on the intermediate transfer belt 21.

A nip region is formed between the intermediate transfer belt 21 and a transfer roller 23a of a secondary transfer apparatus 23. The recording paper sheet conveyed through an S-shaped paper sheet transport path R1 is conveyed while being sandwiched by the nip region. The color toner image on the surface of the intermediate transfer belt 21 is transferred on the recording paper sheet. Then, the recording paper sheet is sandwiched between a heating roller 24 and a pressing roller 25 of a fixing apparatus 17, and heated and pressurized for fixing the color toner image on the recording paper sheet.

On the other hand, a pickup roller 33 extracts the recording paper sheets from a sheet feed cassette 18. The recording paper sheets are conveyed through the paper sheet transport path R1, pass through the secondary transfer apparatus 23 and the fixing apparatus 17, and then are carried out to a discharge tray 39 via a discharge roller 36. This paper sheet transport path R1 includes a registration roller 34, a conveyance roller 35, or the discharge roller 36, and a similar part. The registration roller 34 starts conveying the recording paper sheets matching transfer timing of the toner image at the nip region between the intermediate transfer belt 21 and the transfer roller 23a after the recording paper sheets are once stopped and the top of the recording paper sheets are aligned. The conveyance roller 35 promotes conveyance of the recording paper sheets.

Figure 2:
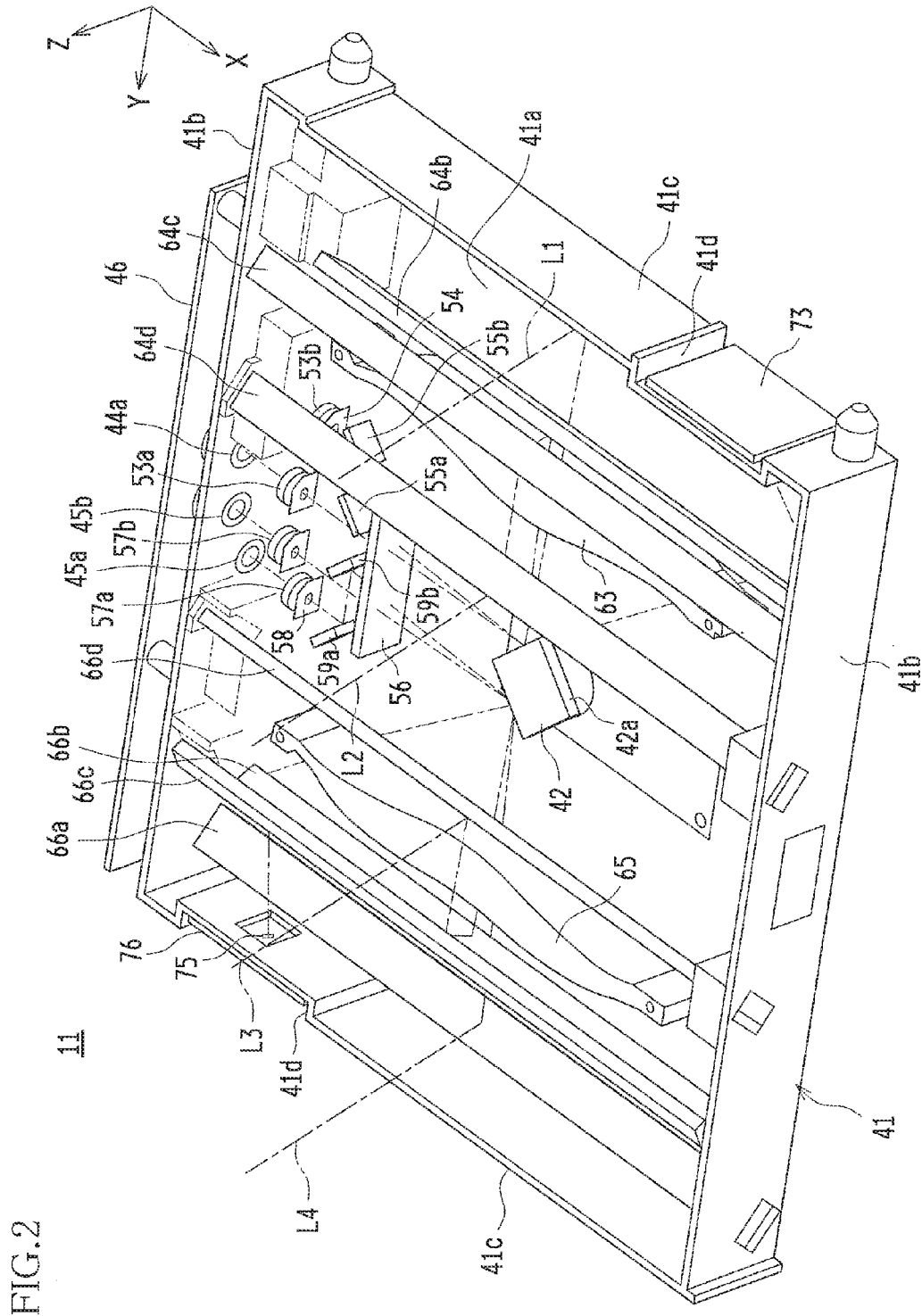
FIG. 2 is a perspective view illustrating an inside of a housing of the light scanning device viewed from obliquely upward and illustrating a state with an upper lid removed.
Figure 3:
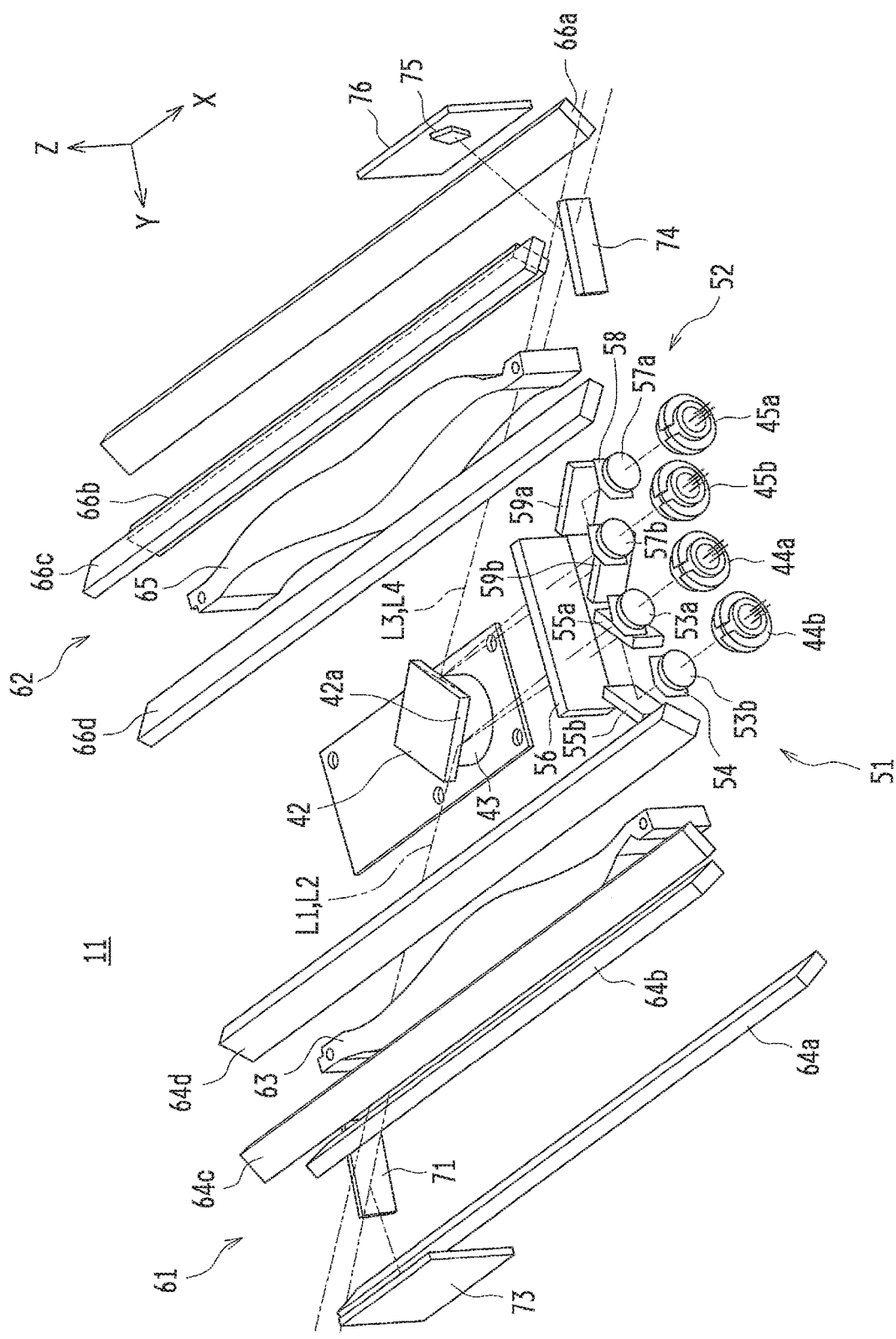
FIG. 3 is a perspective view illustrating a plurality of extracted optical members of the light scanning device and illustrating a state viewed from a back surface side of FIG. 2.
Figure 4:
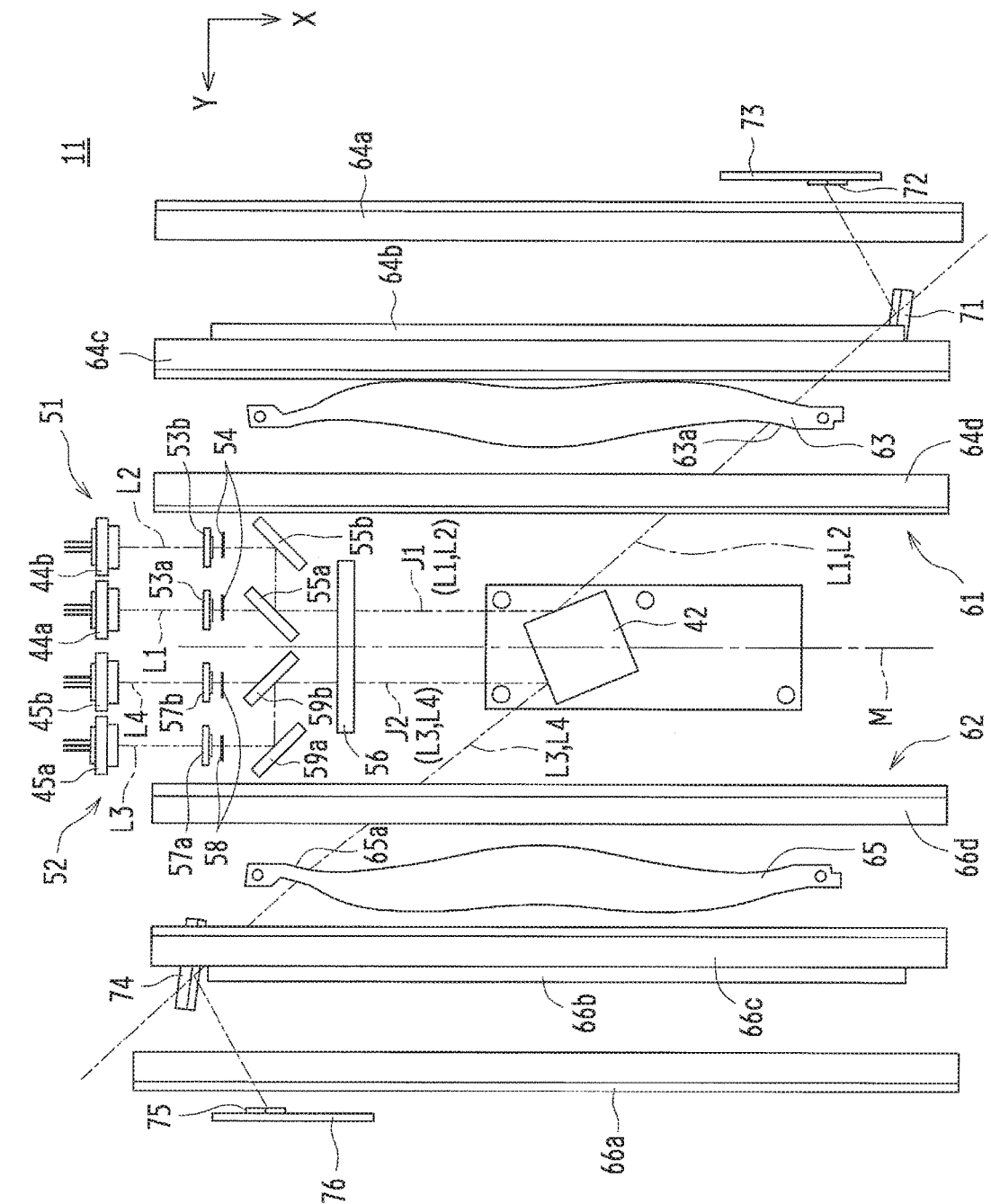
FIG. 4 is a plan view illustrating the plurality of extracted optical members of the light scanning device.
Figure 5:
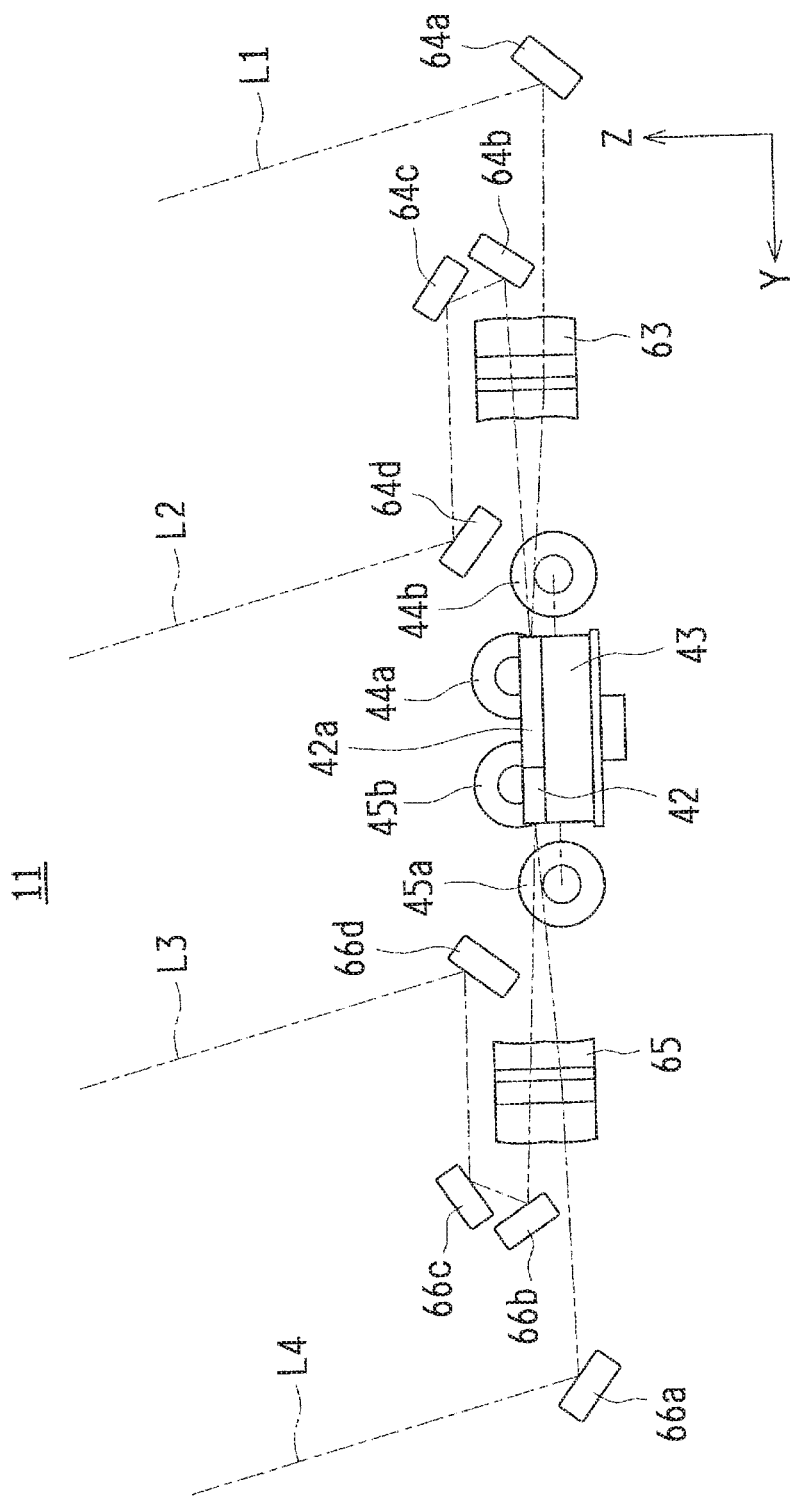
FIG. 5 is a side view illustrating the plurality of extracted optical members of the light scanning device.

Next, the constitution of the light scanning device 11 according to this embodiment will be described in detail using FIG. 2 to FIG. 5. FIG. 2 is a perspective view illustrating an inside of a housing 41 of the light scanning device 11 of FIG. 1 viewed from obliquely upward and illustrating a state with an upper lid removed. FIG. 3 is a perspective view illustrating a plurality of extracted optical members of the light scanning device 11 and illustrating a state viewed from a back surface side of FIG. 2. Further, FIG. 4 and FIG. 5 are a plan view and a side view illustrating the plurality of extracted optical members of the light scanning device 11.

The housing 41 includes a rectangular bottom plate 41a and four side plates 41b and 41c that surround the bottom plate 41a. A polygonal mirror 42, which has a square shape in plan view, is disposed at approximately center of the bottom plate 41a. A polygonal motor 43 is secured at approximately center of the bottom plate 41a. The center of the polygonal mirror 42 is coupled to and secured to a rotation axis of the polygonal motor 43, and the polygonal motor 43 rotates the polygonal mirror 42.

A drive substrate 46 is secured to the outside of one side plate 41b of the housing 41. The drive substrate 46 includes two first semiconductor lasers 44a and 44b and two second semiconductor lasers 45a and 45b (total of four semiconductor lasers). The respective first semiconductor lasers 44a and 44b and the respective second semiconductor lasers 45a and 45b go into the inside of the housing 41 through respective holes formed at the side plate 41b.

Assuming that an imaginary straight line M extends in a main-scanning direction X passing through the center of the polygonal mirror 42, each of the first semiconductor lasers 44a and 44b is disposed symmetry to the respective second semiconductor lasers 45a and 45b placing the imaginary straight line M as the center. A direction perpendicular to the main-scanning direction X is set as a sub-scanning direction Y. A direction perpendicular to the main-scanning direction X and the sub-scanning direction Y (the longitudinal direction of the rotation axis of the polygonal motor 43) is set as a height direction Z.

The drive substrate 46 is a plane plate-shaped printed circuit board and includes circuits for driving the respective first semiconductor lasers 44a and 44b and the respective second semiconductor lasers 45a and 45b. The respective first semiconductor lasers 44a and 44b and the respective second semiconductor lasers 45a and 45b are disposed on an approximately the same plane (YZ plane) by being mounted on the plane plate-shaped printed circuit board. The first semiconductor lasers 44a and 44b and the second semiconductor lasers 45a and 45b emit light beams L1 to L4, respectively. The respective light beams L1 to L4 are emitted in the vertical direction (the main-scanning direction X) with respect to the plane and to the inside of the housing 41.

On the drive substrate 46 (YZ plane), the respective first semiconductor lasers 44a and 44b are disposed at different positions from one another in the sub-scanning direction Y and the height direction Z. Similarly, the respective second semiconductor lasers 45a and 45b are also disposed different positions from one another in the sub-scanning direction Y and the height direction Z.

The light scanning device 11 includes a first incident optical system 51 and a second incident optical system 52. The first incident optical system 51 guides the light beams L1 and L2 of the respective first semiconductor lasers 44a and 44b to the polygonal mirror 42. The second incident optical system 52 guides the light beams L3 and L4 of the respective second semiconductor lasers 45a and 45b to the polygonal mirror 42. The first incident optical system 51 includes two collimator lenses 53a and 53b, two apertures 54, two mirrors 55a and 55b, a cylindrical lens 56, and a similar component. Similarly, the second incident optical system 52 includes two collimator lenses 57a and 57b, two apertures 58, two mirrors 59a and 59b, the cylindrical lens 56, and a similar component. The respective collimator lens 53a and 53b, the respective apertures 54, and the respective mirrors 55a and 55b of the first incident optical system 51 are disposed symmetrical to the respective collimator lens 57a and 57b, the respective apertures 58, and the respective mirrors 59a and 59b of the second incident optical system 52 placing the imaginary straight line M as the center. The imaginary straight line M passes through the center of the cylindrical lens 56. One half side of the cylindrical lens 56 divided by the imaginary straight line M is disposed at the first incident optical system 51 while the other half side of the cylindrical lens 56 is disposed at the second incident optical system 52.

Further, the light scanning device 11 includes a first image-forming optical system 61 and a second image-forming optical system 62. The first image-forming optical system 61 guides the light beams L1 and L2 of the respective first semiconductor lasers 44a and 44b reflected by the polygonal mirror 42 to the two photosensitive drums 13 (not illustrated). The second image-forming optical system 62 guides the light beams L3 and L4 of the respective second semiconductor lasers 45a and 45b reflected by the polygonal mirror 42 to the other two photosensitive drums 13 (not illustrated). The first image-forming optical system 61 is formed of an fθ lens 63, respective four reflective mirrors 64a, 64b, 64c, and 64d, and a similar lens. Similarly, the second image-forming optical system 62 is formed of an fθ lens 65, respective four reflective mirrors 66a, 66b, 66c, and 66d, and a similar lens. The fθ lens 63 and the respective reflective mirrors 64a, 64b, 64c, and 64d of the first image-forming optical system 61 are disposed symmetrical to the fθ lens 65 and the respective reflective mirrors 66a, 66b, 66c, and 66d of the second image-forming optical system 62 placing the imaginary straight line M as the center.

A BD substrate 73 is disposed at the first image-forming optical system 61 side while a BD substrate 76 is also disposed at the second image-forming optical system 62 side. The BD substrate 73 includes a BD mirror 71 and a BD sensor 72. The BD substrate 76 includes a BD mirror 74 and a BD sensor 75. The BD mirror 71 and the BD sensor 72 at the first image-forming optical system 61 side are disposed symmetrical to the BD mirror 74 and the BD sensor 75 at the second image-forming optical system 62 side placing the rotation axis of the polygonal mirror 42 as the center.

Next, optical paths for the light beams L1 and L2 of the respective first semiconductor lasers 44a and 44b to enter the respective photosensitive drums 13, and optical paths for the light beams L3 and L4 of the respective second semiconductor lasers 45a and 45b to enter the respective photosensitive drums 13 will be described.

The light beam L1 of the first semiconductor laser 44a transmits the collimator lens 53a and is made to parallel light. The light beam L1 enters the reflecting surface 42a of the polygonal mirror 42 via the aperture 54, the mirror (semi-transparent mirror) 55a, and the cylindrical lens 56. The light beam L2 of the first semiconductor laser 44b transmits the collimator lens 53b and is made to parallel light. The light beam L2 enters and is reflected by the respective mirrors 55a and 55b via the aperture 54, and enters the reflecting surface 42a of the polygonal mirror 42, via the cylindrical lens 56. The cylindrical lens 56 condenses the respective light beams L1 and L2 so as to almost converge the respective light beams L1 and L2 at the reflecting surface 42a of the polygonal mirror 42 only in the height direction Z.

Here, on the drive substrate 46 (YZ plane), the respective first semiconductor lasers 44a and 44b are disposed at different positions from one another in the sub-scanning direction Y. However, the light beam L2 of the first semiconductor laser 44b is reflected by the respective mirrors 55a and 55b to be shifted to a first optical path J1 in common with the light beam L1 of the first semiconductor laser 44a in the sub-scanning direction Y. The first optical path J1 is the optical path from the mirror 55a to the reflecting surface 42a of the polygonal mirror 42 via the cylindrical lens 56. In this first optical path J1, as illustrated in FIG. 4, the respective light beams L1 and L2 overlap with each other in plan view.

On the drive substrate 46 (the YZ plane), the respective first semiconductor lasers 44a and 44b are disposed at different positions from one another in the height direction Z. However, setting of the emission directions of the light beams L1 and L2 of the respective first semiconductor lasers 44a and 44b or the orientations of the respective mirrors 55a and 55b almost superimposes incident spots (first incident spots) of the respective light beams L1 and L2 on the reflecting surface 42a of the polygonal mirror 42. In view of this, in the first optical path J1, the light beams L1 and L2 of the respective first semiconductor lasers 44a and 44b enter from obliquely upward and obliquely downward to the reflecting surface 42a of the polygonal mirror 42. Then, the respective light beams L1 and L2 reflected by the reflecting surface 42a of the polygonal mirror 42 are away from one another in the obliquely downward direction and the obliquely upward direction. The light beam L1 at one side is reflected by the reflecting surface 42a of the polygonal mirror 42 to obliquely downward, transmits the fθ lens 63, is reflected by the one mirror 64a, and enters the photosensitive drum 13 (not illustrated) where yellow toner image is to be formed. The light beam L2 at the other side is reflected by the reflecting surface 42a of the polygonal mirror 42 to obliquely upward, transmits the fθ lens 63, is sequentially reflected by the three mirrors 64b, 64c, and 64d, and enters the photosensitive drum 13 (not illustrated) where a magenta toner image is to be formed.

The polygonal motor 43 rotates the polygonal mirror 42 at equal angular velocity. Then, the polygonal mirror 42 sequentially reflects the respective light beams L1 and L2 at the respective reflecting surfaces 42a, and causes the respective light beams L1 and L2 to be repeatedly deflected at the equal angular velocity in the main-scanning direction X. The fθ lens 63 condenses and emits the respective light beams L1 and L2 in both the main-scanning direction X and the sub-scanning direction Y such that the respective light beams L1 and L2 may have a predetermined beam diameter at the surface of the respective photosensitive drums 13. Moreover, the fθ lens 63 transforms the respective light beams L1 and L2 deflected at the equal angular velocity in the main-scanning direction X by the polygonal mirror 42 such that the respective light beams L1 and L2 may move at the equal linear velocity along the main-scanning line on respective photosensitive drums 13. Thus, the respective light beams L1 and L2 are repeatedly scanned on the surface of respective photosensitive drums 13 in the main-scanning direction X.

Immediately before start of main scanning of the respective photosensitive drums 13 with the respective light beams L1 and L2, the light beam L1 at one side transmits a convex lens portion 63a formed in the end portion of the fθ lens 63 to enter the BD mirror 71 and is reflected by the BD mirror 71 to enter the BD sensor 72. The BD sensor 72 receives the light beam L1 at timing immediately before the start of main scanning of the respective photosensitive drums 13, and outputs a BD signal indicating timing immediately before the start of the main scanning According to this BD signal, the timing of starting main scanning of the respective photosensitive drums 13 on which yellow and magenta toner images are formed is determined. Then, modulation of the respective light beams L1 and L2 according to the respective image data with yellow and magenta is started.

On the other hand, the respective photosensitive drums 13 where yellow and magenta toner images are to be formed are rotatably driven. The respective light beams L1 and L2 scan a two-dimensional surface (a circumference surface) of the respective photosensitive drums 13. Thus, respective electrostatic latent images are formed at the surfaces of the respective photosensitive drums 13.

Next, the light beam L3 of the second semiconductor laser 45a transmits the collimator lens 57a and is made to parallel light. The light beam L3 enters and is reflected by the respective mirrors 59a and 59b via the aperture 58, and transmits the cylindrical lens 56 to enter the reflecting surface 42a of the polygonal mirror 42. The light beam L4 of the second semiconductor laser 45b transmits the collimator lens 57b and is made to parallel light. The light beam L4 enters the reflecting surface 42a of the polygonal mirror 42 via the aperture 58, the mirror (semi-transparent mirror) 59b, and the cylindrical lens 56.

On the drive substrate 46 (YZ plane), the respective second semiconductor lasers 45a and 45b are disposed at different positions from one another in the sub-scanning direction Y. However, the light beam L3 of the second semiconductor laser 45a is reflected by the respective mirrors 59a and 59b to be shifted to a second optical path J2 in common with the light beam L4 of the second semiconductor laser 44b in the sub-scanning direction Y. The second optical path J2 is the optical path from the mirror 59b to the reflecting surface 42a of the polygonal mirror 42 via the cylindrical lens 56. In the second optical path J2, as illustrated in FIG. 4, the respective light beams L3 and L4 overlap with each other in plan view.

On the drive substrate 46 (the YZ plane), the respective second semiconductor lasers 45a and 45b are disposed at different positions from one another in the height direction Z. However, setting of the emission directions of the light beams L3 and L4 of the respective second semiconductor lasers 45a and 45b or the orientations of respective mirrors 59a and 59b almost superimposes incident spots (second incident spots) of the respective light beams L3 and L4 on the reflecting surface 42a of the polygonal mirror 42. In view of this, in the second optical path J2, the light beams L3 and L4 of the respective second semiconductor lasers 45a and 45b enter from obliquely downward and obliquely upward to the reflecting surface 42a of the polygonal mirror 42. Then, when being reflected by the reflecting surface 42a of the polygonal mirror 42, the respective light beams L3 and L4 are away from one another in the obliquely upward direction and the obliquely downward direction. The light beam L3 at one side is reflected by the reflecting surface 42a of the polygonal mirror 42 to obliquely upward, transmits the fθ lens 65, is sequentially reflected by the three mirrors 66b, 66c, and 66d, and enters the photosensitive drum 13 (not illustrated) where cyan toner image is to be formed. The light beam L4 at the other side is reflected by the reflecting surface 42a of the polygonal mirror 42 to obliquely downward, transmits the fθ lens 65, is reflected by the one mirror 66a, and enters the photosensitive drum 13 (not illustrated) where black toner image is to be formed.

Immediately before start of main scanning of the respective photosensitive drums 13 with the respective light beams L3 and L4, the other light beam L4 transmits a convex lens portion 65a formed in the end portion of the fθ lens 65 to enter the BD mirror 74 and is reflected by the BD mirror 74 to enter the BD sensor 75. The BD sensor 75 outputs a BD signal indicating timing immediately before the start of the main scanning of the respective photosensitive drums 13 with the respective light beams L3 and L4. According to this BD signal, the timing of starting main scanning of the respective photosensitive drums 13 where cyan and black toner images are to be formed is determined. Then, modulation of the respective light beams L3 and L4 according to respective cyan and black image data is started.

On the other hand, the respective photosensitive drums 13 where cyan and black toner images are to be formed are rotatably driven. The respective light beams L3 and L4 scan a two-dimensional surface (a circumference surface) of the respective photosensitive drums 13. Thus, respective electrostatic latent images are formed at the surfaces of the respective photosensitive drums 13.

The light scanning device 11 with this constitution includes the polygonal mirror 42 at the approximately center of the bottom plate 41a of the housing 41. The light scanning device 11 includes the respective first semiconductor lasers 44a and 44b and the respective second semiconductor lasers 45a and 45b disposed symmetrically to one another placing the imaginary straight line M passing through the center of the polygonal mirror 42 as the center. Here, the first incident optical system 51 is disposed symmetrically to the second incident optical system 52, and the first image-forming optical system 61 is disposed symmetrically to the second image-forming optical system 62. This allows approximately downsizing the light scanning device 11 viewed from the side by aggregating the polygonal mirror 42, the respective first semiconductor lasers 44a and 44b, the respective second semiconductor lasers 45a and 45b, the first incident optical system 51, the second incident optical system 52, or a similar component in a small space.

The light beams L1 and L2 of the respective first semiconductor lasers 44a and 44b enter the approximately identical first incident spots on the reflecting surface 42a of the polygonal mirror 42. Additionally, the light beams L3 and L4 of the respective second semiconductor lasers 45a and 45b enter the approximately identical second incident spots on the reflecting surface 42a of the polygonal mirror 42. This thins the thickness of the polygonal mirror 42, and the polygonal mirror 42 does not cause an increase in height of the light scanning device 11.

Further, the respective light beams L1 and L2 reflected by the reflecting surface 42a of the polygonal mirror 42 move apart from each other in the obliquely downward direction and the obliquely upward direction. On the other hand, the arranged position of the fθ lens 63 with respect to the polygonal mirror 42 is set such that the respective light beams L1 and L2 enter the fθ lens 63 before the separation distance between the respective light beams L1 and L2 in the up-down direction becomes long. Similarly, the respective light beams L3 and L4 reflected by the reflecting surface 42*a* of the polygonal mirror 42 move apart from each other in the obliquely downward direction and the obliquely upward direction. On the other hand, the arranged position of the fθ lens 65 with respect to the polygonal mirror 42 is set such that the respective light beams L3 and L4 enter the fθ lens 65 before the separation distance between the respective light beams L3 and L4 in the up-down direction becomes long. This thins the respective thicknesses of the fθ lenses 63 and 65, and the respective fθ lenses 63 and 65 do not cause an increase in height of the light scanning device 11.

The respective mirrors 55*a* and 55*b* shift the light beam L2 of the first semiconductor laser 44*b* to the first optical path J1 near the imaginary straight line M (the center of the device) in the sub-scanning direction Y and then causes the light beam L2 to enter the polygonal mirror 42. Additionally, the respective mirrors 59*a* and 59*b* shift the light beam L3 of the second semiconductor laser 45*a* to the second optical path J2 near the imaginary straight line M (the center of the device) in the sub-scanning direction Y and then causes the light beam L3 to enter the polygonal mirror 42. Accordingly, the diameter of the polygonal mirror 42 can be reduced such that the first image-forming optical system 61 and the second image-forming optical system 62 becomes closer to each other. This reduces the depth and the lateral width of the light scanning device 11 so as to downsize the light scanning device 11.

Further, the respective first semiconductor lasers 44*a* and 44*b* and the respective second semiconductor lasers 45*a* and 45*b* are mounted on the identical drive substrate 46. This ensures a small parts count and simplifies the wiring for the respective semiconductor lasers 44*a*, 44*b*, 45*a*, and 45*b*.

Now, the arranged positions or similar parameter of a plurality of optical members such as mirrors and lenses are appropriately set so as to downsize the light scanning device 11. On the other hand, it is also necessary to appropriately set the arranged positions of the respective BD mirrors 71 and 74, the respective BD sensors 72 and 75, and the respective BD substrates 73 and 76 so as to downsize the light scanning device 11. In particular, since the respective BD substrates 73 and 76 have large sizes, the BD substrates 73 and 76 might block the respective light beams L1 to L4 or hinder downsizing of the light scanning device 11 depending on the arranged positions of the BD substrates 73 and 76.

Figure 6:
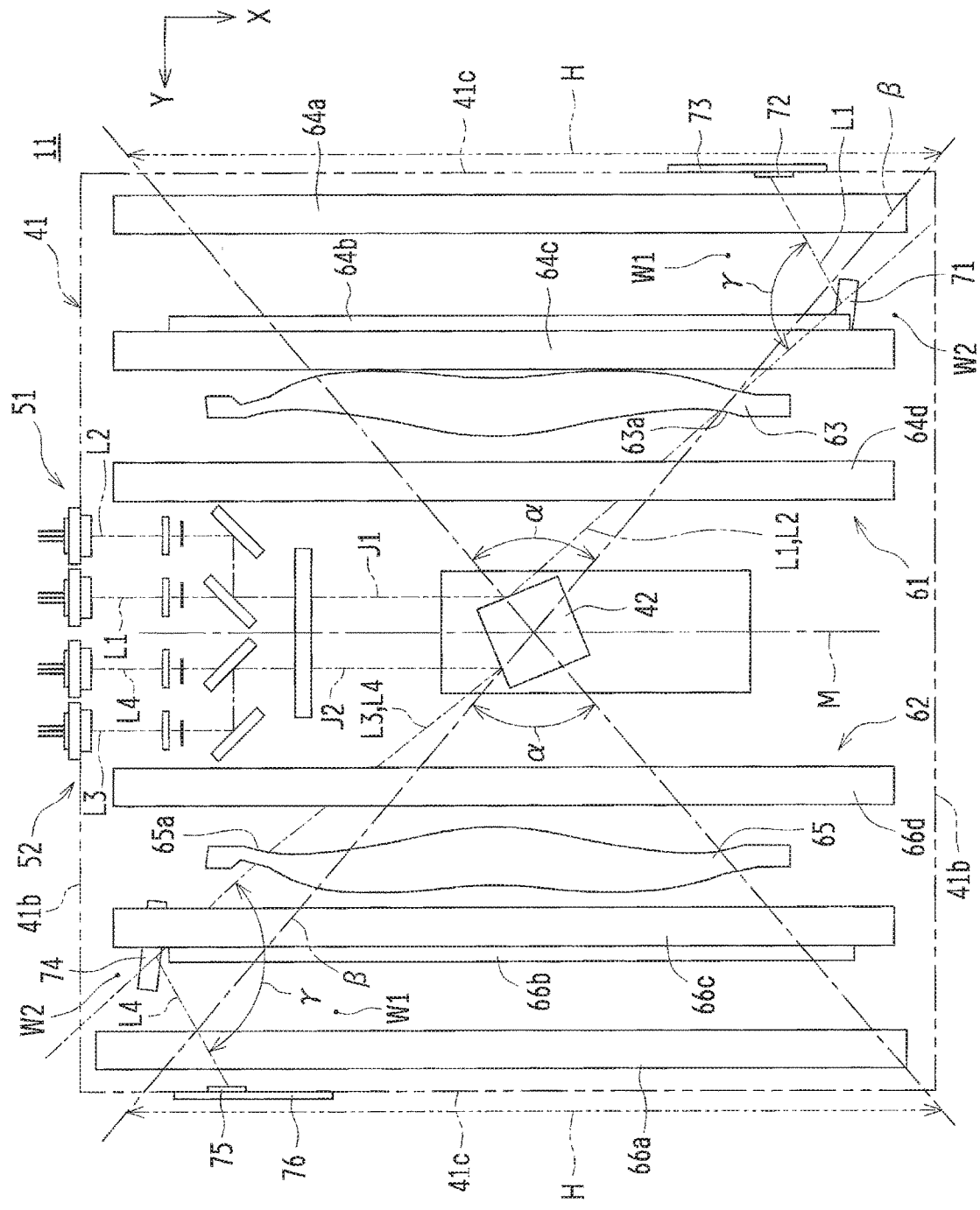
FIG. 6 is a plan view illustrating the arranged positions of the respective optical members in the housing of the light scanning device.
Figure 7:
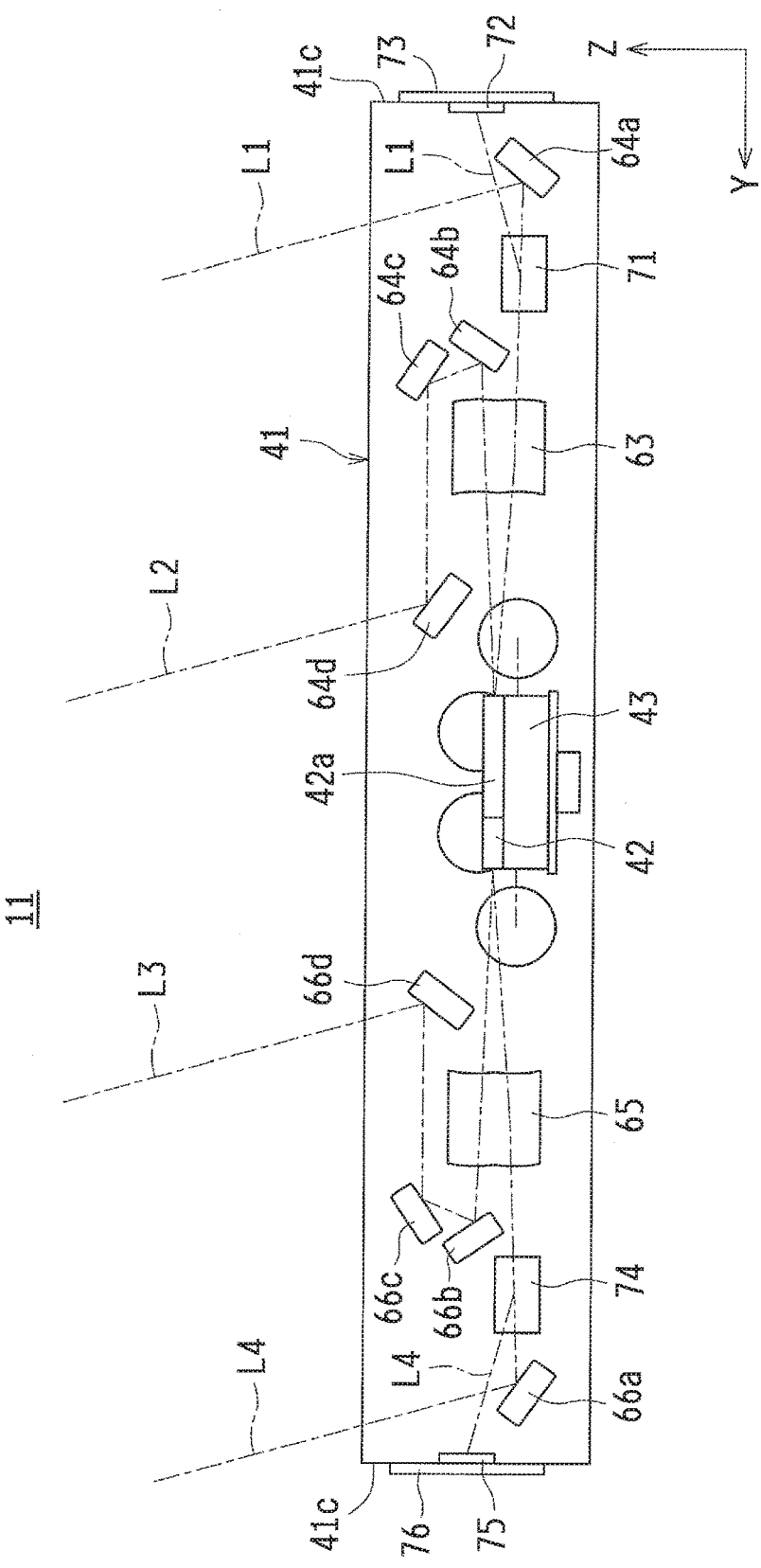
FIG. 7 is a side view illustrating the arranged positions of the respective optical members in the housing of the light scanning device.

Here, FIG. 6 and FIG. 7 are a plan view and a side view illustrating the arranged positions of the respective optical members in the housing 41 of the light scanning device 11. As illustrated in FIG. 6, the respective light beams L1 to L4 are reflected by the polygonal mirror 42 so as to be repeatedly deflected in an approximately fan-shaped range (not illustrated). This approximately fan-shaped range includes a scanning angle range α for the respective light beams L1 to L4. The scanning angle range α is needed for scanning an effective scan area H for the respective photosensitive drums 13.

The effective scan area H is an area on each photosensitive drums 13 scanned by each of the light beams L1 to L4, and is a region including a formation region of an electrostatic latent image. In practice, the effective scan areas H of the respective photosensitive drums 13 are positioned upward of the respective reflective mirrors 64*a*, 64*d*, 66*a*, and 66*d*. However, FIG. 6 illustrates the effective scan area H expanded in a two-dimensional plane.

If the respective BD substrates 73 and 76 on which the respective BD sensors 72 and 75 are mounted are arranged at positions W1 within the scanning angle range α as illustrated in FIG. 6, the respective BD substrates 73 and 76 interfere with the respective light beams L1 to L4 so as to hinder formation of electrostatic latent images. Alternatively, if the respective BD substrates 73 and 76 are arranged at positions W2 outside the scanning angle range α, it is necessary to increase the depth of the housing 41 to form arrangement spaces of the respective BD substrates 73 and 76.

Accordingly, in the light scanning device 11 according to this embodiment, the arranged positions of the respective BD mirrors 71 and 74, the respective BD sensors 72 and 75, and the respective BD substrates 73 and 76 are set as illustrated in FIG. 6 and FIG. 7.

In detail, the respective BD substrates 73 and 76 are overlapped with the outside of the respective side plates 41*c* in the housing 41, and the respective BD sensors 72 and 75 face the inside of the housing 41 through the holes of the respective side plates 41*c*. The respective BD mirrors 71 and 74 are arranged inside the housing 41 and outside the scanning angle range α.

The respective light beams L1 to L4 are reflected by the polygonal mirror 42 and repeatedly deflected in an approximately fan-shaped range. The respective BD mirrors 71 and 74 reflect the respective light beams L1 and L4 immediately before entering the scanning angle range α and cause the light beams L1 and L4 to enter the respective BD sensors 72 and 75. The respective BD sensors 72 and 75 detect the respective light beams L1 and L4 and output respective BD signals.

The respective light beams L1 and L4 are reflected by the polygonal mirror 42 in the obliquely downward direction and enter the respective BD mirrors 71 and 74. The directions of the reflecting surfaces of the respective BD mirrors 71 and 74 are set to the obliquely upward directions so as to reflect the respective light beams L1 and L4 in the obliquely upward directions. When reflected in the obliquely upward directions at the BD mirrors 71 and 74, the respective beams L1 and L4 pass through the upper side of the respective mirrors 64*a* and 66*a* and enter the respective BD sensors 72 and 75. Then, the respective BD sensors 72 and 75 output the respective BD signals.

Based on the respective BD signals, when the respective light beams L1 to L4 enter the scanning angle range α, modulation of the respective light beams L1 to L4 according to the respective image data is simultaneously started so as to form respective electrostatic latent images on the surfaces of the respective photosensitive drums 13. Accordingly, the timing when scanning on the respective photosensitive drums 13 using the respective light beams L1 to L4 is started is synchronized with the detection timing of the respective light beams L1 and L4 using the respective BD sensors 72 and 75.

The following describes the mounting structures, the positions, and similar configuration of the respective BD mirrors 71 and 74 and the respective BD sensors 72 and 75 in detail.

Figure 8:
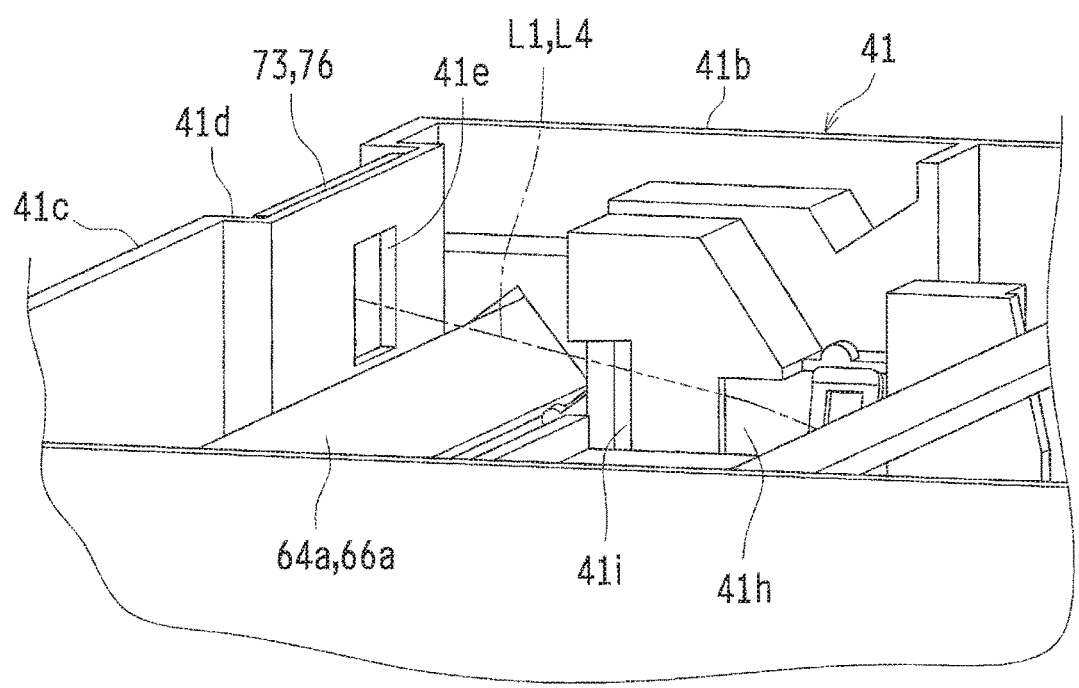
FIG. 8 is an enlarged perspective view illustrating BD mirrors and BD sensors viewed from the inside of the housing in the obliquely upward direction.
Figure 9:
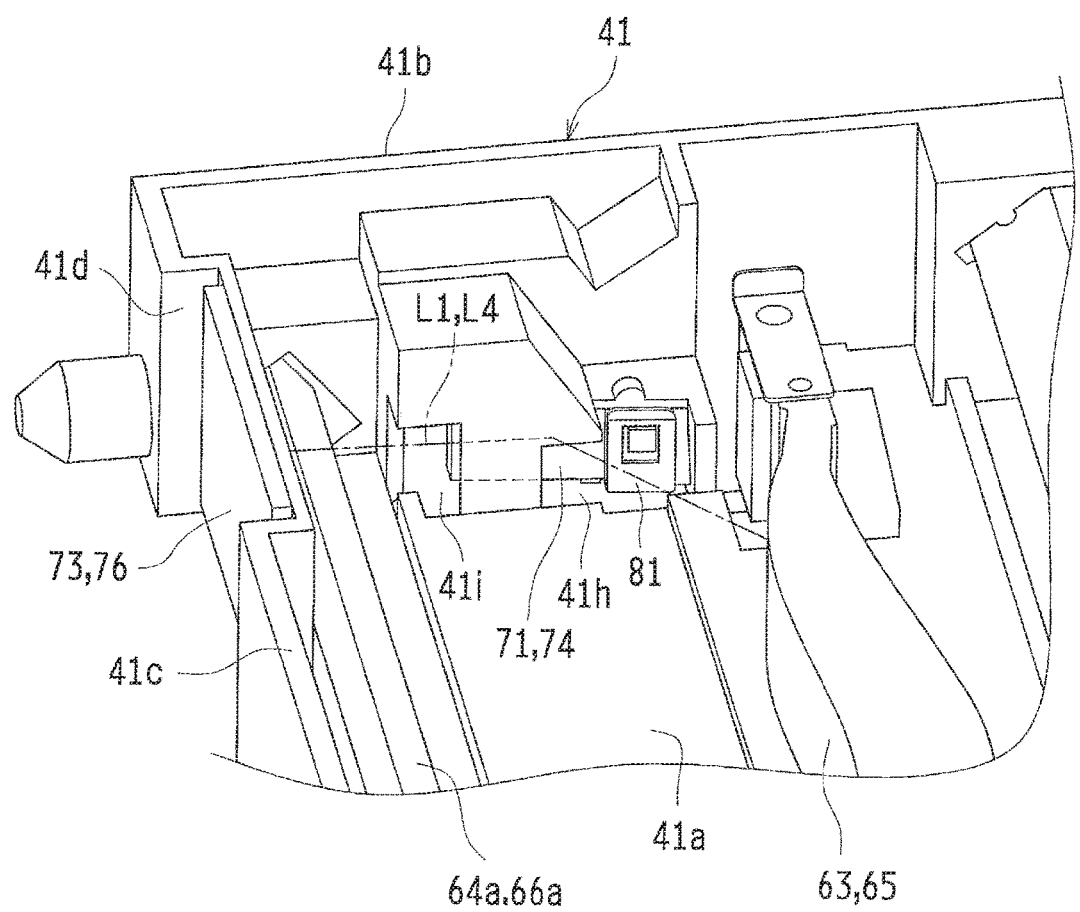
FIG. 9 is an enlarged perspective view illustrating the BD mirrors and the BD sensors viewed from the outside of the housing in the obliquely upward direction.

FIG. 8 is an enlarged perspective view illustrating the respective BD mirrors 71 and 74 and the respective BD sensors 72 and 75 viewed from the inside of the housing 41 in the obliquely upward direction. FIG. 9 is an enlarged perspective view illustrating the respective BD mirrors 71 and 74 and the respective BD substrates 73 and 76 viewed from the outside of the housing 41 in the obliquely upward direction. As illustrated in FIG. 8 and FIG. 9, a depressed portion 41d is formed outside the side plate 41c of the housing 41, and the BD substrate 73 (or 76) is secured to this depressed portion 41d. Inside the depressed portion 41d, a rectangular hole 41e is formed. The BD sensor 72 (or 75) faces the inside of the housing 41 through the rectangular hole 41e.

Figure 10:
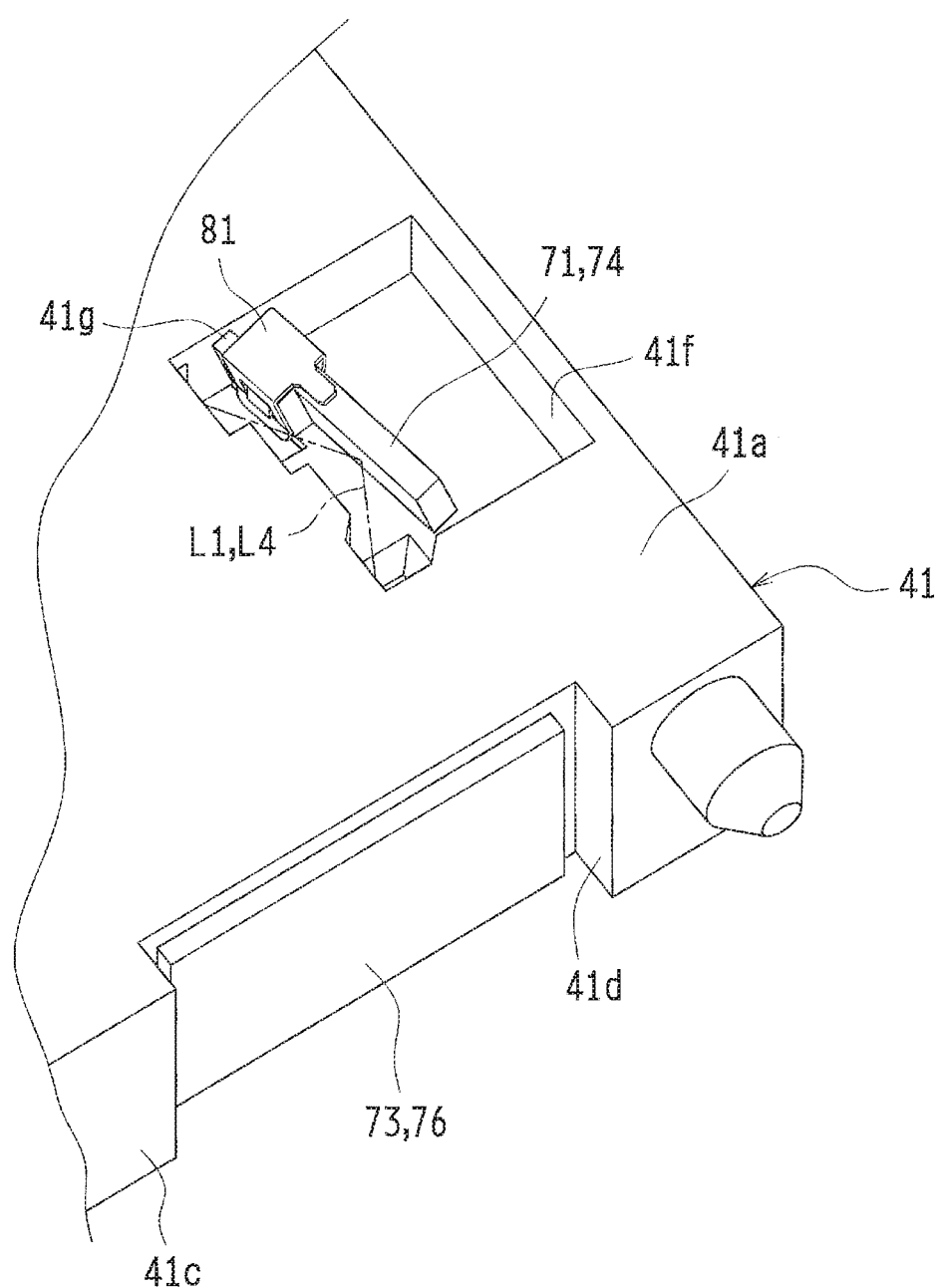
FIG. 10 is an enlarged perspective view illustrating the mounting structure for the BD mirrors on the bottom surface in a bottom plate of the housing.
Figure 11:
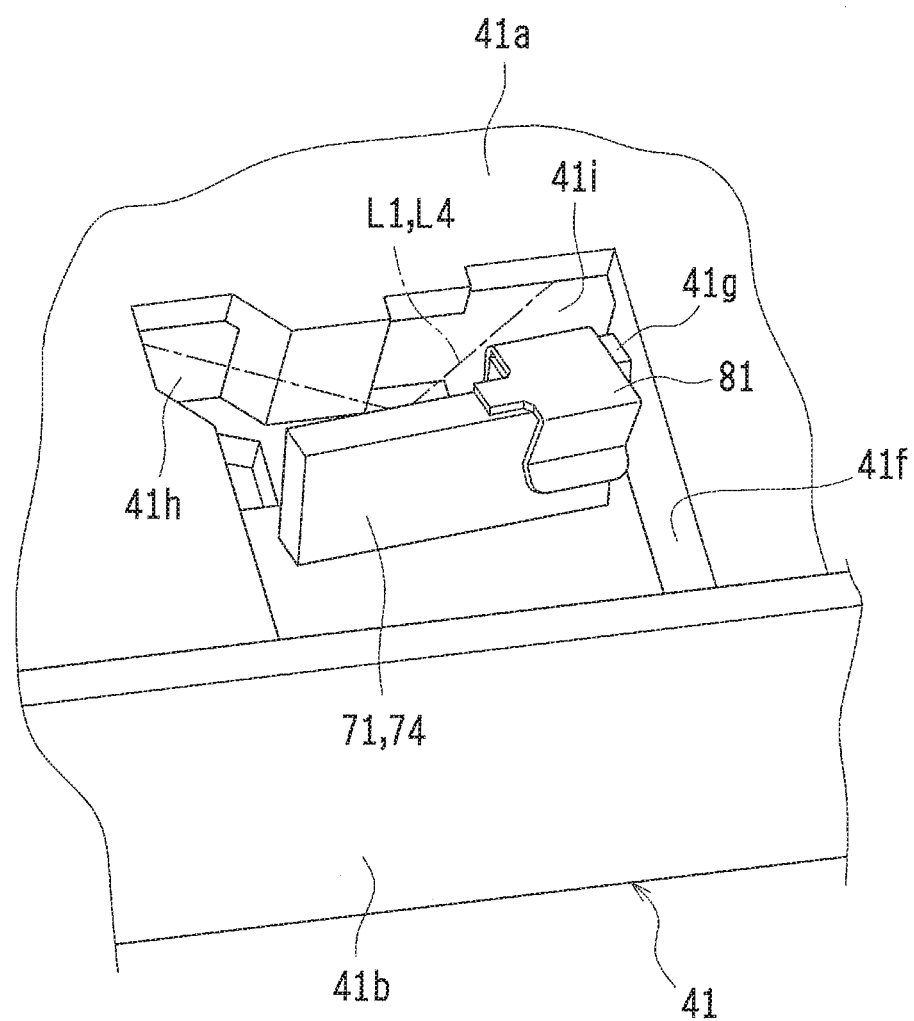
FIG. 11 is a perspective view illustrating the mounting structure for the BD mirrors viewed from a direction different from FIG. 10.

FIG. 10 is an enlarged perspective view illustrating the mounting structure for the respective BD mirrors 71 and 74 on the bottom surface in the bottom plate 41a in the housing 41. FIG. 11 is a perspective view illustrating the mounting structure for the respective BD mirrors 71 and 74 viewed from a direction different from FIG. 10. As illustrated in FIG. 10 and FIG. 11, a depressed portion 41f is formed on the bottom surface in the bottom plate 41a, and the BD mirror 71 (or 74) is arranged in the depressed portion 41f. Inside this depressed portion 41f, a supporting piece 41g protrudes. The BD mirror 71 (or 74) overlaps with the supporting piece 41g, and the supporting piece 41g and the BD mirror 71 (or 74) are sandwiched by a spring member 81 having an approximately U-shaped cross-sectional shape so as to hold the BD mirror 71 (or 74).

In the depressed portion 41f, an entrance hole 41h and an emission hole 41i are formed. The entrance hole 41h causes the light beam L1 (or L4) reflected by the polygonal mirror 42 to pass through and enter the BD mirror 71 (or 74). The emission hole 41i emits the light beam L1 (or L4) reflected by the BD mirror 71 (or 74) to the BD sensor 72 (or 75).

As apparent from FIG. 6, in plan view of the respective BD mirrors 71 and 74, the respective BD mirrors 71 and 74 are arranged at the lower side of the respective mirrors 64b, 64c, 66b, and 66c while the respective BD mirrors 71 and 74 are disposed in the respective depressed portions 41f on the bottom surface in the bottom plate 41a. Accordingly, the respective BD mirrors 71 and 74 can be mounted and removed from the bottom surface side in the bottom plate 41a regardless of the existence or absence of the respective mirrors 64b, 64c, 66b, and 66c.

In this configuration, the respective mirrors 64a and 66a reflect the respective light beams L1 and L4 immediately before entering the respective photosensitive drums 13, and are the mirrors separated from the polygonal mirror 42 the most among the respective mirrors of the first and second image-forming optical systems 61 and 62. Further, the respective mirrors 64a and 66a are the mirrors that reflect the respective light beams L1 and L4 detected by the respective BD sensors 72 and 75. Accordingly, the respective mirrors 64a and 66a are referred to as respective last mirrors 64a and 66a.

Here, as apparent from FIG. 2 and FIG. 6, the respective BD substrates 73 and 76 are overlapped with the outside of the respective side plates 41c in the housing 41. Accordingly, the respective BD substrates 73 and 76 are arranged outside the respective last mirrors 64a and 66a arranged inside the respective side plate 41c (at both ends inside the housing 41), that is, in the positions farther from the polygonal mirror 42 than the respective last mirrors 64a and 66a. The respective BD sensors 72 and 75 are also arranged in the identical position. Accordingly, the respective BD sensors 72 and 75 and the respective BD substrates 73 and 76 do not interfere with the respective light beams L1 to L4.

Since the respective BD substrates 73 and 76 are overlapped with the outside of the respective side plates 41c in the housing 41, it is not necessary to peculiarly form arrangement spaces of the respective BD sensors 72 and 75 and the respective BD substrates 73 and 76 in the sub-scanning direction Y. Accordingly, the lateral width of the housing 41 can be set according to the positions of the respective last mirrors 64a and 66a so as to set the minimum lateral width of the light scanning device 11. Further, since the heights of the respective BD substrates 73 and 76 are set to be equal to or less than the heights of the respective side plates 41c in the housing 41, the respective BD substrates 73 and 76 do not cause an increase in height of the light scanning device 11.

As apparent from FIG. 6, the respective BD sensors 72 and 75 and the respective BD substrates 73 and 76 are arranged within the scanning angle range α.

Accordingly, regarding the depth of the light scanning device 11, it is not necessary to peculiarly form arrangement spaces of the respective BD sensors 72 and 75 and the respective BD substrates 73 and 76 and it is only necessary to fit the scanning angle range α to the inside of the housing 41 between the respective mirrors 64a and 66a. Thus, it is not necessary to increase the depth of the light scanning device 11.

As illustrated in FIG. 6, the respective BD mirrors 71 and 74 are arranged outside the scanning angle range α, and the respective BD sensors 72 and 75 and the respective BD mirrors 71 and 74 are arranged in the vicinity of a boundary line β between the inside and the outside of the scanning angle range α. This increases bending angles γ of the respective light beams L1 and L4 when being reflected and bent by the respective BD mirrors 71 and 74. The respective light beams L1 and L4 approximately vertically enter the light receiving surfaces of the respective BD sensors 72 and 75 such that the light receiving amounts of the respective BD sensors 72 and 75 increase. This improves the accuracy of the detection timing of the respective light beams L1 and L4 using the respective BD sensors 72 and 75.

Since the respective convex lens portions 63a and 65a are disposed in the end portions of the respective fθ lenses 63 and 65, the respective light beams L1 and L4 can be condensed by the respective convex lens portions 63a and 65a and then reflected by the respective BD mirrors 71 and 74 to enter the respective BD sensors 72 and 75. This reduces the spots of the respective light beams L1 and L4 on the light receiving surfaces of the respective BD sensors 72 and 75. This also improves the accuracy of the detection timing of the respective light beams L1 and L4 using the respective BD sensors 72 and 75. Adjustment of the focal lengths of the respective convex lens portions 63a and 65a allows freely setting the distances from the polygonal mirror 42 to the respective BD mirrors 71 and 74 and the distances from the respective BD mirrors 71 and 74 to the respective BD sensors 72 and 75 while maintaining the small spots of the respective light beams L1 and L4 on the light receiving surfaces of the respective BD sensors 72 and 75. Thus, the light scanning device 11 can be downsized.

As just described, in the light scanning device 11 according to this embodiment, the respective BD substrates 73 and 76 are overlapped with the outside of the respective side plates 41c in the housing 41. The respective BD substrates 73 and 76 are arranged in the positions farther from the polygonal mirror 42 than the respective last mirrors 64a and 66a. Accordingly, the respective BD sensors 72 and 75 and the respective BD substrates 73 and 76 do not interfere with the respective light beams L1 to L4.

Since the respective BD substrates 73 and 76 are overlapped with the outside of the respective side plates 41c in the housing 41, it is not necessary to peculiarly form arrangement spaces of the respective BD sensors 72 and 75 and the respective BD substrates 73 and 76 in the sub-scanning direction Y. Accordingly, the lateral width of the housing 41 can be set according to the positions of the respective last mirrors 64a and 66a so as to set the minimum lateral width of the light scanning device 11. Further, since the heights of the respective BD substrates 73 and 76 are set to be equal to or less than the heights of the respective side plates 41c in the housing 41, the respective BD substrates 73 and 76 do not cause an increase in height of the light scanning device 11.

Since the respective BD sensors 72 and 75 and the respective BD substrates 73 and 76 are arranged within the scanning angle range α, regarding the depth of the light scanning device 11, it is not necessary to peculiarly form arrangement spaces of the respective BD sensors 72 and 75 and the respective BD substrates 73 and 76. Thus, it is not necessary to increase the depth of the light scanning device 11.

The respective BD mirrors 71 and 74 are arranged outside the scanning angle range α, and the respective BD sensors 72 and 75 and the respective BD mirrors 71 and 74 are arranged in the vicinity of a boundary line β between the inside and the outside of the scanning angle range α. The respective light beams L1 and L4 approximately vertically enter the light receiving surfaces of the respective BD sensors 72 and 75 such that the light receiving amounts of the respective BD sensors 72 and 75 increase. This improves the accuracy of the detection timing of the respective light beams L1 and L4 using the respective BD sensors 72 and 75.

Further, the light beams L1 and L4 are be condensed by the respective convex lens portions 63a and 65a of the respective fθ lenses 63 and 65 and then reflected by the respective BD mirrors 71 and 74 to enter the respective BD sensors 72 and 75. This improves the accuracy of the detection timing of the respective light beams L1 and L4 using the respective BD sensors 72 and 75. This allows freely setting the distances from the polygonal mirror 42 to the respective BD mirrors 71 and 74 and the distances from the respective BD mirrors 71 and 74 to the respective BD sensors 72 and 75 while maintaining the small spots of the respective light beams L1 and L4 on the light receiving surfaces of the respective BD sensors 72 and 75. Thus, the light scanning device 11 can be downsized.

Here, in the above-described embodiment, as illustrated in FIG. 7, the respective beams L1 and L4 are reflected by the respective BD mirrors 71 and 74 in the obliquely upward directions and passes above the respective mirrors 64a and 66a. In the case where the light scanning device 11 is inverted in the up-down direction, the respective beams L1 and L4 are reflected by the respective BD mirrors 71 and 74 in the obliquely downward directions and enter the respective BD sensors 72 and 75 while passing below the respective mirrors 64a and 66a.

The preferred embodiment according to the present invention is described above with reference to the attached drawings; however, it is needless to say that the present invention is not limited to the above examples. It would be obvious that an ordinary skilled person conceives various modifications and corrections within scopes defined in the claims, and it should be understood that those modified examples fall within the technical scope of the present invention.

INDUSTRIAL APPLICABILITY

The present invention is appropriate for a light scanning device that includes: a light-emitting element that emits a light beam; an optical sensor that detects a light beam; a deflecting section that deflects a light beam; and a reflective mirror that reflects a light beam and that scan a scan object with a light beam, and is appropriate for an image forming apparatus with the light scanning device.

This application is based on and claims priority to Japanese Patent Application 2012-230098, filed in Japan on Oct. 17, 2012, the entire contents of which are incorporated herein by reference.

DESCRIPTION OF REFERENCE SIGNS

1 image forming apparatus
11 light scanning device
12 development apparatus
13 photosensitive drum (scan object)
14 drum cleaning apparatus
15 charging unit
17 fixing apparatus
21 intermediate transfer belt
22 belt cleaning apparatus
23 secondary transfer apparatus
33 pickup roller
34 registration roller
35 conveyance roller
36 discharge roller
41 housing
42 polygonal mirror (deflecting section)
43 polygonal motor
44a, 44b first semiconductor laser (light-emitting element)
45a, 45b second semiconductor laser (light-emitting element)
46 drive substrate
51 first incident optical system
52 second incident optical system
53a, 53b, 57a, 57b collimator lens
55a, 55b, 59a, 59b mirror
56 cylindrical lens
61 first image-forming optical system
62 second image-forming optical system
63, 65 fθ lens
63a, 65a convex lens portion
64a to 64d, 66a to 66d mirror (reflective mirror)
71, 74 BD mirror (detecting mirror)
72, 75 BD sensor (optical sensor)
73, 76 BD substrate

The invention claimed is:
1. A light scanning device, comprising:
a light-emitting element;
a deflecting section configured to deflect a light beam emitted from the light-emitting element;
at least one reflective mirror configured to reflect the light beam and cause the light beam to enter a scan object, the light beam being emitted from the light-emitting element and deflected by the deflecting section; and
an optical sensor configured to detect the light beam deflected by the deflecting section, wherein
the light scanning device is configured to scan the scan object with the light beam and set scanning timing of the scan object using the light beam based on detection timing of the light beam using the optical sensor, and
the optical sensor is arranged inside an arrangement area of a last one of the at least one reflective mirror in a main-scanning direction, the last reflective mirror being configured to reflect the light beam immediately before entering the scan object.

2. The light scanning device according to claim 1, further comprising
  a detecting mirror configured to reflect a light beam deflected by the deflecting section and cause the light beam to enter the optical sensor, wherein
  the detecting mirror is arranged outside a scanning angle range of the light beam corresponding to an effective scan area of the scan object, and
  the optical sensor and the detecting mirror are arranged in a vicinity of a boundary between an inside and an outside of the scanning angle range of the light beam.

3. The light scanning device according to claim 1, further comprising
  a detecting mirror configured to reflect a light beam deflected by the deflecting section and cause the light beam to enter the optical sensor, wherein
  the detecting mirror is arranged outside a bottom section of a housing of the light scanning device, and
  a light beam entering and reflected to the detecting mirror passes through a hole formed in the bottom section.

4. The light scanning device according to claim 1, wherein the optical sensor is mounted on a substrate disposed outside a sidewall of a housing of the light scanning device.

5. An image forming apparatus, comprising the light scanning device according to claim 1, wherein the image forming apparatus forms a latent image on a scan object by the light scanning device, develops the latent image on the scan object as a visible image, and transfers and forms the visible image from the scan object to a paper sheet.

6. A light scanning device, comprising:
  a light-emitting element;
  a deflecting section configured to deflect a light beam emitted from the light-emitting element;
  at least one reflective mirror configured to reflect the light beam and cause the light beam to enter a scan object, the light beam being emitted from the light-emitting element and deflected by the deflecting section; and
  an optical sensor configured to detect the light beam deflected by the deflecting section, wherein
  the light scanning device is configured to scan the scan object with the light beam and set scanning timing of the scan object using the light beam based on detection timing of the light beam using the optical sensor, and
  the optical sensor is (i) in a position farther from the deflecting section than a particular one of the at least one reflective mirror, the particular reflective mirror being arranged farthest from the deflecting section, and (ii) inside an arrangement area of a last one of the at least one reflective mirror in a main-scanning direction, the last reflective mirror being configured to reflect the light beam immediately before entering the scan object.

7. The light scanning device according to claim 6, wherein the farthest reflective mirror from the deflecting section is arranged at one end inside a housing of the light scanning device.

8. The light scanning device according to claim 6, further comprising
  a plurality of the light-emitting elements, wherein
  the optical sensor detects a light beam of any of the plurality of the light-emitting elements, and
  the farthest reflective mirror from the deflecting section reflects the light beam detected by the optical sensor to the scan object.

9. The light scanning device according to claim 6, further comprising
  a detecting mirror configured to reflect a light beam deflected by the deflecting section and cause the light beam to enter the optical sensor, wherein
  the optical sensor is arranged in a position where the light beam enters after the light beam is reflected by the detecting mirror and passes above an upper end or below a lower end of the farthest reflective mirror from the deflecting section.

10. The light scanning device according to claim 9, wherein
  the detecting mirror is arranged outside a scanning angle range of the light beam corresponding to an effective scan area of the scan object, and
  the optical sensor and the detecting mirror are arranged in a vicinity of a boundary between an inside and an outside of the scanning angle range of the light beam.

11. The light scanning device according to claim 9, wherein
  the detecting mirror is arranged outside a bottom section of a housing of the light scanning device, and
  a light beam entering and reflected to the detecting mirror passes through a hole formed in the bottom section.

12. The light scanning device according to claim 9, further comprising
  an fθ lens disposed in an optical path of light beam from the deflecting section to the farthest reflective mirror from the deflecting section, wherein
  the fθ lens includes an optical section configured to transmit the light beam before entering the detecting mirror, and
  the optical section has focusing property.

13. The light scanning device according to claim 6, wherein the optical sensor is mounted on a substrate disposed outside a sidewall of a housing of the light scanning device.

14. An image forming apparatus, comprising
  the light scanning device according to claim 6, wherein
  the image forming apparatus forms a latent image on a scan object by the light scanning device, develops the latent image on the scan object as a visible image, and transfers and forms the visible image from the scan object to a paper sheet.

* * * * *